United States Patent
Ji et al.

(10) Patent No.: US 9,078,270 B2
(45) Date of Patent: Jul. 7, 2015

(54) OPPORTUNISTIC RELAY SCHEDULING IN WIRELESS COMMUNICATIONS

(75) Inventors: Tingfang Ji, San Diego, CA (US); Kambiz Azarian Yazdi, San Diego, CA (US); Dexu Lin, San Diego, CA (US); Anastasios Stamoulis, San Diego, CA (US); Arnab Chakrabarti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 12/483,125

(22) Filed: Jun. 11, 2009

(65) Prior Publication Data

US 2010/0002656 A1 Jan. 7, 2010

Related U.S. Application Data

(60) Provisional application No. 61/078,239, filed on Jul. 3, 2008.

(51) Int. Cl.

| | |
|---|---|
| *H04M 11/00* | (2006.01) |
| *H04W 72/08* | (2009.01) |
| *H04W 88/04* | (2009.01) |
| *H04W 84/04* | (2009.01) |
| *H04W 72/04* | (2009.01) |

(52) U.S. Cl.
CPC ............ *H04W 72/082* (2013.01); *H04W 88/04* (2013.01); *H04W 84/047* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 5,428,603 A | 6/1995 | Kivett | |
| 6,690,657 B1 | 2/2004 | Lau et al. | |
| 6,791,968 B2 * | 9/2004 | Kotzin | 370/348 |
| 6,795,410 B1 | 9/2004 | Janky et al. | |

(Continued)

FOREIGN PATENT DOCUMENTS

| | | |
|---|---|---|
| CN | 101064547 A | 10/2007 |
| CN | 101174873 A | 5/2008 |

(Continued)

OTHER PUBLICATIONS

International Search Report and Written Opinion—PCT/US2009/049588, International Search Authority—European Patent Office—Mar. 26, 2010.

(Continued)

*Primary Examiner* — Fan Ng

(57) ABSTRACT

Systems and methodologies are described that facilitate providing opportunistic relay node communication based on scheduling of other communications in a wireless network. In particular, a relay node can maintain a backhaul link with an access point and an access link with a mobile device to facilitate communicating information therebetween. Time slots during which the backhaul link is active can be determined and avoided during scheduling access link communications with the mobile device. Furthermore, resource assignments from the access point to the mobile device can be monitored and decoded such that time slots associated therewith can also be determined and avoided. Thus, the relay node can communicate with mobile devices in time slots where the backhaul link is inactive and/or the mobile devices are not occupied communicating directly with the access point.

47 Claims, 11 Drawing Sheets

(56) References Cited

U.S. PATENT DOCUMENTS

| | | | |
|---|---|---|---|
| 6,889,047 B2 * | 5/2005 | Ishida | 455/450 |
| 7,873,002 B2 * | 1/2011 | Cai | 370/329 |
| 8,165,059 B2 * | 4/2012 | Fujii et al. | 370/315 |
| 2003/0189916 A1 | 10/2003 | Cornett et al. | |
| 2004/0071107 A1 | 4/2004 | Kats et al. | |
| 2004/0258029 A1 | 12/2004 | Beard et al. | |
| 2005/0117536 A1 | 6/2005 | Cho et al. | |
| 2006/0046643 A1 | 3/2006 | Izumikawa et al. | |
| 2006/0183421 A1 | 8/2006 | Proctor, Jr. et al. | |
| 2006/0203856 A1 * | 9/2006 | Laroia et al. | 370/522 |
| 2008/0045148 A1 | 2/2008 | Okuda | |
| 2008/0069079 A1 | 3/2008 | Jacobs | |
| 2008/0205323 A1 * | 8/2008 | Kaneko et al. | 370/315 |

FOREIGN PATENT DOCUMENTS

| | | |
|---|---|---|
| EP | 1424865 | 6/2004 |
| EP | 1919160 A1 | 5/2008 |
| JP | 2001053673 A | 2/2001 |
| JP | 2002335204 | 11/2002 |
| JP | 2006074325 A | 3/2006 |
| JP | 2008503139 A | 1/2008 |
| JP | 2008048203 A | 2/2008 |
| WO | WO0115354 A1 | 3/2001 |
| WO | WO2004032362 | 4/2004 |
| WO | WO2004103001 A2 | 11/2004 |
| WO | WO-2005125047 A1 | 12/2005 |
| WO | WO2007086620 A2 | 8/2007 |
| WO | WO2007096762 A2 | 8/2007 |
| WO | WO2007113730 A1 | 10/2007 |
| WO | WO2008015567 A2 | 2/2008 |
| WO | WO2008036784 A2 | 3/2008 |
| WO | WO-2008047429 A1 | 4/2008 |

OTHER PUBLICATIONS

Partial International Search Report—PCT/US2009/049588, International Search Authority—European Patent Office, Nov. 12, 2009.
European Search Report—EP11160852—Search Authority—The Hague—Jan. 22, 2013.
Taiwan Search Report—TW098122625—TIPO—Feb. 20, 2014.

* cited by examiner

OPPORTUNISTIC RELAY SCHEDULING IN WIRELESS COMMUNICATIONS

CLAIM OF PRIORITY UNDER 35 U.S.C. §119

The present Application for Patent claims priority to Provisional Application No. 61/078,239 entitled "OPPORTUNISTIC RELAY COMMUNICATION BASED ON SCHEDULER ASSIGNMENT KNOWLEDGE" filed Jul. 3, 2008, and assigned to the assignee hereof and hereby expressly incorporated by reference herein.

BACKGROUND

1. Field

The following description relates generally to wireless communications, and more particularly to relay node resource assignment and communication.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on downlinks and uplinks. The downlink (or forward link) refers to the communication link from access points to mobile devices, and the uplink (or reverse link) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Relay nodes can be provided in wireless communication systems to increase network capacity and improve energy efficiency. In particular, relay nodes can be of multiple types. In one example, a relay node can autonomously facilitate communication between mobile devices and access points. For example, the relay node can independently schedule communications with an access point, over a backhaul link, and with a mobile device, over an access link. The relay node can subsequently decode and forward received communications between the links.

In another example, a relay node can superimpose access link communication on top of direct communication from the access point to the mobile device to provide amplification, additional redundancy in the transmission, and/or the like. In either case, a relay node can be open half-duplex, such that it receives or transmits communications in a given time period. In this regard, relay nodes typically follow a statically defined communication specification where a collection of time slots can be used for receiving over the backhaul link while another collection of time slots can be used for transmitting over the access link.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating opportunistic relay node communication based at least in part on analyzing scheduling assignments of access points and/or related mobile devices. For example, a relay node can predict time slots or other resources over which a backhaul link is active and assign disparate time slots/resources for communicating with the mobile devices so as not to interfere with the backhaul link communications. In another example, the relay node can listen to scheduling assignments for given mobile devices from related access points to determine when the mobile devices and access points communicate. Time slots or other resources related to the scheduling assignments can be avoided as well. Thus, opportunistic communication is facilitated at the relay node without interference to communicating access points or mobile devices.

According to related aspects, a method is provided that includes maintaining a backhaul link with one or more access points and determining one or more backhaul link resources over which information is received from the one or more access points over the backhaul link. Furthermore, the method can include selecting one or more access link resources, based on the determined backhaul link resources, for communicating with one or more mobile devices over an access link.

Another aspect relates to a wireless communications apparatus. The wireless communications apparatus can include at least one processor configured to maintain a backhaul link with an access point and predict one or more backhaul link resources over which the backhaul link is active. The at least one processor is further configured to select a set of resources different from the one or more backhaul link resources over which to communicate with a mobile device using an access link. The wireless communications apparatus also comprises a memory coupled to the at least one processor.

Yet another aspect relates to an apparatus that includes means for communicating with one or more access points over a backhaul link. The apparatus further includes means for scheduling a set of resources for communicating with one or more mobile devices over an access link based at least in part on determining a backhaul link activity in one or more backhaul link resources.

Still another aspect relates to a computer program product, which can have a computer-readable medium including code for causing at least one computer to maintain a backhaul link with one or more access points. The computer-readable medium can also comprise code for causing the at least one computer to determine one or more backhaul link resources during which information is received from the one or more access points over the backhaul link. Moreover, the computer-readable medium can comprise code for causing the at least one computer to select one or more access link resources, based on the one or more backhaul link resources, for communicating with one or more mobile devices over an access link.

Moreover, an additional aspect relates to an apparatus. The apparatus can include a backhaul link component that maintains a backhaul link with one or more access points. The apparatus further includes a link scheduling component that allocates a set of resources for communicating with one or more mobile devices over an access link based at least in part on determining a backhaul link activity in one or more backhaul link resources.

According to additional aspects, a method is provided that includes determining a time slot for receiving a backhaul link assignment according to an assignment protocol, wherein the assignment protocol defines an access link latency between an access link resource assignment and an access link communication over the access link resource assignment. The method also includes receiving the backhaul link assignment from one or more access points during the time slot.

Another aspect relates to a wireless communications apparatus. The wireless communications apparatus can include at least one processor configured to discern a time slot for receiving a backhaul link assignment according to an assignment protocol, wherein the assignment protocol defines an access link latency between an access link resource assignment and an access link communication over the access link resource assignment. The at least one processor is further configured to receive the backhaul link assignment from one or more access points during the time slot. The wireless communications apparatus also comprises a memory coupled to the at least one processor.

Yet another aspect relates to an apparatus that includes means for determining a time slot for receiving a backhaul link assignment according to an assignment protocol, wherein the assignment protocol defines an access link latency between an access link resource assignment and an access link communication over the access link resource assignment. The apparatus further includes means for receiving the backhaul link assignment from one or more access points during the time slot.

Still another aspect relates to a computer program product, which can have a computer-readable medium including code for causing at least one computer to determine a time slot for receiving a backhaul link assignment according to an assignment protocol, wherein the assignment protocol defines an access link latency between an access link resource assignment and an access link communication over the access link resource assignment. Moreover, the computer-readable medium can comprise code for causing the at least one computer to receive the backhaul link assignment from one or more access points during the time slot.

Moreover, an additional aspect relates to an apparatus. The apparatus can include a backhaul link component that determines a time slot for receiving a backhaul link assignment according to an assignment protocol and receives the backhaul link assignment during the time slot from one or more access points, wherein the assignment protocol defines an access link latency between an access link resource assignment and an access link communication over the access link resource assignment. The apparatus further includes an access link component that transmits the access link resource assignment to one or more mobile devices according to the access link latency and the backhaul link assignment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
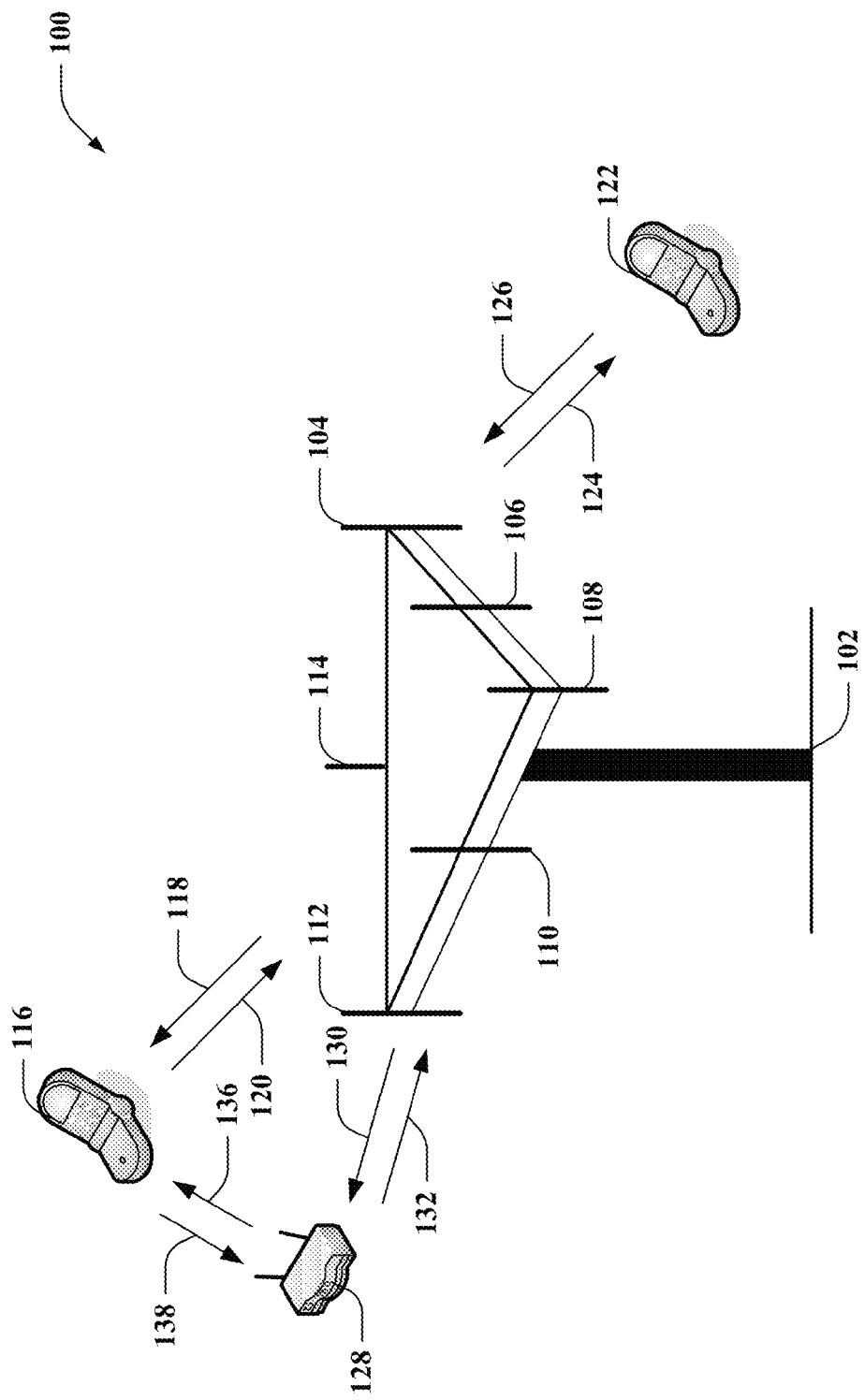
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM , etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a downlink 118 and receive information from mobile device 116 over an uplink 120. Moreover, mobile device 122 is in communication with antennas 104 and 106, where antennas 104 and 106 transmit information to mobile device 122 over a downlink 124 and receive information from mobile device 122 over an uplink 126. In a frequency division duplex (FDD) system, downlink 118 can utilize a different frequency band than that used by uplink 120, and downlink 124 can employ a different frequency band than that employed by uplink 126, for example. Further, in a time division duplex (TDD) system, downlink 118 and uplink 120 can utilize a common frequency band and downlink 124 and uplink 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over downlinks 118 and 124, the transmitting antennas of base station 102 can utilize beamforming to improve signal-to-noise ratio of downlinks 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 102 can communicate to the mobile devices 116 and 122 over the channels, which can be created for various types of data. For example, channels can be created for communicating various types of general communication data, control data (e.g., quality information for other channels, acknowledgement indicators for data received over channels, interference information, reference signals, etc.), and/or the like.

In addition, a relay node 128 is provided that facilitates forwarding communications from base station 102 to mobile device 116. In particular, the relay node 128 can maintain a backhaul link with the base station by receiving over a downlink 130 and transmitting over an uplink 132 similarly to the mobile devices 116 and 122. Moreover, the relay node can communicate with the mobile device 116 over an access link by transmitting data over a downlink 136 and receiving data over an uplink 138, similarly to mobile device 116 communication with the base station 102, as described. Thus, for example, the relay node 128 can receive data over the uplink 138 from mobile device 116, decode the data, and re-transmit the data to the base station over uplink 132. Additionally, for example, the relay node can receive data from the base station over the downlink 130, decode the data, and re-transmit the data to the mobile device 116 over the downlink 136. It is to be appreciated that the relay node can provide such functionality to a plurality of disparate mobile devices that may be additionally communicating with the base station 102 or another base station, for example. This can be based on device proximity to the relay node 128, in an example.

According to an example, the relay node 128 can schedule communications with the mobile device 116 and base station 102, as described above. The relay node 128, however, can be open half duplex such that it does not both transmit and receive in the same time slot (e.g., frame, sub-frame, or portion thereof) or other resource. Transmissions from base station 102 to the relay node 128 can have a different latency between scheduling and assignment than transmissions from relay node 128 to mobile device 116. This can be, for example, due to processing delay at the relay node 128 caused by decoding transmissions and resending the transmissions to the mobile device 116.

In this regard, the relay node 128 can schedule communications with the mobile device 116 when the relay node 128 is not receiving from or transmitting to the base station 102. In addition, the relay node 128 can schedule communications with the mobile device 116, for example, when the mobile device 116 is not receiving from or transmitting to the base station 102 or another base station or mobile device. In an example, the relay node 128 can determine time slots or other resources over which the mobile device 116 is transmitting to or receiving from the base station 102 by receiving the downlink assignment for the mobile device 116 transmitted over downlink 118 and/or 130.

Figure 2:
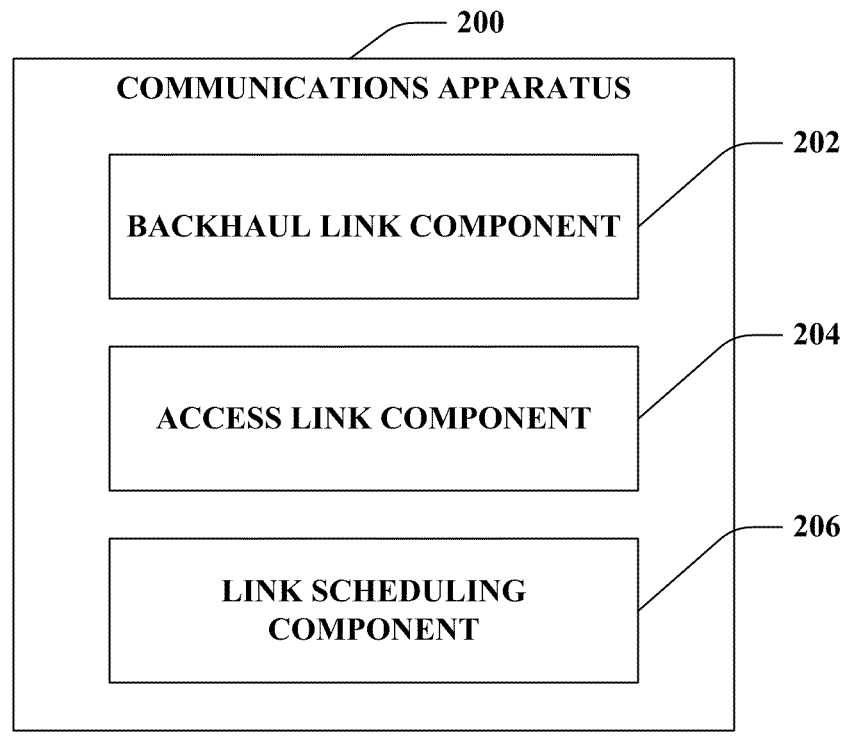
FIG. 2 is an illustration of an example communications apparatus for employment within a wireless communications environment.

Turning to FIG. 2, illustrated is a communications apparatus 200 for employment within a wireless communications environment. The communications apparatus 200 can be a relay node or a portion thereof, or substantially any communications apparatus that receives and forwards information in a wireless network. The communications apparatus 200 includes a backhaul link component 202 that can establish communications with a component that provides access to a wireless network, such as an access point, an access link component 204 that can facilitate communicating with a device in a wireless network to provide access thereto, and a link scheduling component 206 that can allocate resources for communicating over the access link component 204 based at least in part on assigned resources for communicating over the backhaul link component 202.

According to an example, the backhaul link component 202 can establish communications with an access point (not shown) and receive downlink and uplink resources (e.g., a backhaul link assignment); in one example, this can be on behalf of a mobile device (not shown) communicating with the communications apparatus 200. Furthermore, the backhaul link assignment can be received in an upper layer message (e.g., a message at a media access control (MAC) layer, application layer, etc.), which can be a persistent assignment, in one example. The link scheduling component 206 can determine time slots or other resources (e.g., frequency resources) for allocating downlink and uplink resources to the mobile device based on information regarding the backhaul link component 202 and/or based on information received thereover. The access link component 204 can allocate the resources to the mobile device according to the determined time slots or other resources. In one example, the backhaul link component 202 can determine a time slot for receiving a backhaul link assignment according to an assignment protocol. The assignment protocol, for example, can specify parameters for backhaul link latency (e.g., between backhaul link assignment and communication) as well as access link latency. The latencies can be variable or fixed. Where variable, for example, the backhaul link assignment can include information regarding one or more time slots and a periodicity of the time slots for a duration of time. According to another example, the access link latency can be less than the backhaul link latency to allow time for establishing the access link and communications thereover for information received over the backhaul.

In an example, the link scheduling component 206 can predict time slots or other resources during which the backhaul link component 202 is receiving data from or transmitting data to the access point. This can be based on the assignment protocol, one or more received scheduling decisions for the backhaul link component 202, monitoring the backhaul link, etc. In addition, the link scheduling component 206 can determine a latency difference between the scheduling decisions and transmission received over the backhaul link component 202 as possible time slots/resources for communicating over the access link component 204. Moreover, the link scheduling component 206 can predict time slots or other resources during which the mobile device will communicate with the access point based on receiving time slot/resource information from resource assignment messages sent from the access point to the mobile device. Using the foregoing information, the link scheduling component 206 can select resources that are not being used by the backhaul link component 202 or in communications between the access point and mobile device, for communicating with the mobile device. In addition, it is to be appreciated that the backhaul link assignment can each be a physical channel that assigns backhaul link communication over a backhaul link time slot or other resources. Similarly, the access link assignment can each be a physical channel that assigns access link communication over a access link time slot or other resources.

Figure 3:
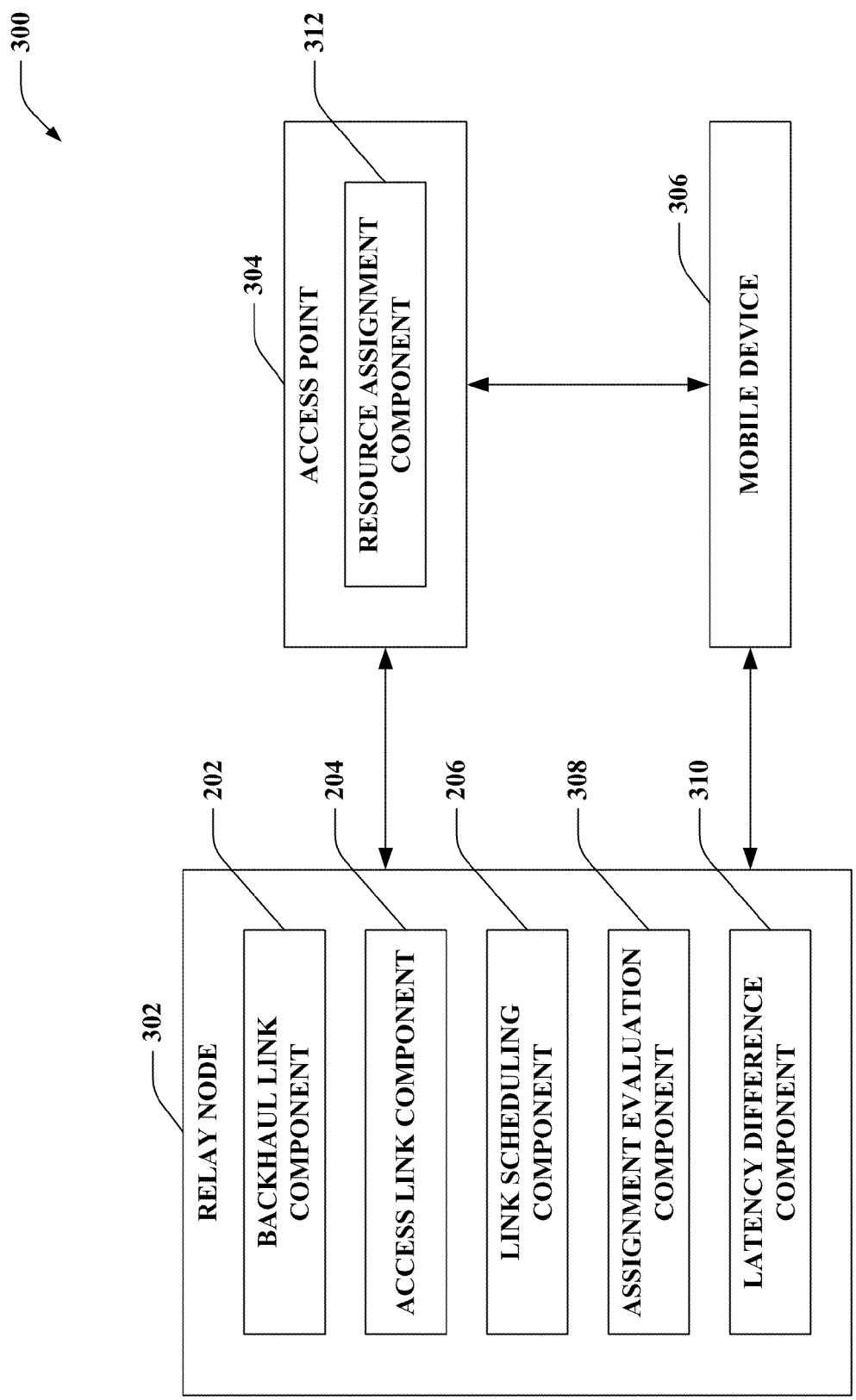
FIG. 3 is an illustration of an example wireless communications system that effectuates scheduling access link communication time slots.

Now referring to FIG. 3, illustrated is a wireless communications system 300 that facilitates opportunistic relay node communication based at least in part on determining scheduling assignments. Relay node 302 can provide access to an access point 304 to one or more mobile devices 306, and can be a relay node 302 that decodes and forwards (e.g., a type 1 relay node), a relay node that superimposes its signal over a direct signal from the access point 304 to the mobile device 306 or vice versa (e.g., a type 2 relay node) to add redundancy, amplification, etc., and/or the like. In addition, access point 304 can be a base station, femtocell access point, picocell access point, another relay node, and/or the like. Mobile device 306 can be not only an independently powered device, but also modem or tethered device, for example, a base station, and/or portion thereof, or substantially any wireless device. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communication between the relay node 302, access point 304, and mobile device 306 and/or additional relay nodes, access points, or mobile devices.

Relay node 302 can include a backhaul link component 202 that communicates with the access point 304, an access link component 204 that communicates with the mobile device 306, a link scheduling component 206 that determines time slots for allocating uplink or downlink resources, an assignment evaluation component 308 that analyzes scheduling assignments from the access point 304 to determine time slots for resource allocation, and a latency difference component 310 that accounts for lag between resource assignment and transmission in determining time slots for allocating resources. In addition, the access point 304 can comprise a resource assignment component 312 that allocates downlink and uplink resources to the relay node 302 and/or mobile device 306.

According to an example, the backhaul link component 202 can request wireless network access from the access point 304 (e.g., in response to receiving an access request from the mobile device 306). In another example, the access point 304 can initiate communication with the relay node 302. In either case, the resource assignment component 312 can allocate uplink and downlink resources to the relay node 302 to facilitate communicating thereover, as described. In addition, where the mobile device 306 communicates directly with the access point 304, the resource assignment component 312 can allocate uplink and downlink resources to the mobile device 306. In an example, the mobile device 306 can additionally or alternatively initialize communications with the relay node 302; the access link component 204 can receive a corresponding request from the mobile device 306. Thus, the backhaul link component 202 can communicate with the access point 304, and the access link component 204 can communicate with the mobile device 306 providing relay functionality.

As described, the relay node 302 can be open half duplex so it can receive or transmit in a given time slot; thus, only the backhaul link component 202 or the access link component 204 can be active in a given time slot. In addition, as mentioned, the backhaul link component 202 can receive information from the access point 304, decode the information, and re-transmit the information to the mobile device 306 using the access link component 204. In another example, as mentioned, the backhaul link component 202 can receive a signal from the access point 304, and the access link component 204 can add amplification, redundancy, and/or the like to the signal (e.g., superimposing on top of the signal) and forward the signal to the mobile device 306. The relay node 302 can similarly receive, decode, and forward (or receive, amplify, and forward) on the uplink as well.

The relay node 302 can determine time slots for communicating with the mobile device 306 over the access link component 204 by predicting time slots currently in use or to be used subsequently by the backhaul link component 202 in receiving information from or transmitting information to the access point 304. The link scheduling component 206 can avoid these time slots and select disparate time slot(s) when allocating communication resources to the mobile device 306. In an example, the assignment evaluation component 308 can analyze a resource assignment from the resource assignment component 312 to the relay node 302, or observe backhaul link component 202 activity, to determine time slots subsequently utilized by the backhaul link component 202. For example, the assignment evaluation component 308 can discern time slots assigned to the relay node 302 for receiving data from or transmitting data to the access point 304 using the backhaul link component 202, and the link scheduling component 206 can avoid these time slots in selecting resources or time slots for communicating with the mobile device 306. It is to be appreciated that the relay node 302 can communicate with other access points as well, in which case additional time slots for avoidance by the link scheduling component 206 can similarly be determined.

In addition, the mobile device 306 can be communicating with both the access point 304 and the relay node 302, and the relay node 302 can be of the decode and forward type (e.g., type 1), as described above. In this example, the assignment evaluation component 308 can additionally avoid time slots where the mobile device is communicating with the access point 304. Thus, for example, the relay node can analyze downlink resource assignments from the resource assignment component 312 to the mobile device 306 to determine time slots when the mobile device 306 will be receiving communications from the access point 304. For example, the relay node 302 can receive the assignment by listening to a direct transmission from the access point 304 to the mobile device 306. The assignment evaluation component 308 can decode and interpret the resources assignment to determine resources or related time slots over which the mobile device 306 will be receiving from or transmitting to the access point 304. The link scheduling component 206 can schedule around these time slots as well in selecting resources for communicating with the mobile device 306.

Moreover, the latency difference component 310 can compute a latency disparity between the relay node 302 and access point 304 caused by processing at the relay node. Resources occurring within the latency disparity period after receiving a transmission from the access point 304 can be scheduled by the link scheduling component 206 for communicating with the mobile device 306 as well since the access point 304 is likely not transmitting to the relay node 302 again, at least not communications related to the mobile device 306, during the latency period. It is to be appreciated that the relay node 302 can serve multiple mobile devices (not shown) and can schedule transmissions with each one over the access link component 204, as described, during time slots where the backhaul link component 202 is not active (e.g., not transmitting to or receiving from the access point 304), as predicted by the link scheduling component 206.

Once the link scheduling component 206 selects resources for communicating with the mobile device 306 that do not interfere with communications at the backhaul link component 202 (or direct communications from the access point 304 to the mobile device 306 for decode and forward type relay nodes), the access link component 204 can send a related resource assignment to the mobile device 306. The mobile device 306 can subsequently receive and/or transmit information over the access link component 204 using the assigned resources. In addition, though not shown, the relay node 302 can communicate with multiple access points, in which the backhaul link component 202 can similarly negotiate resources with the multiple access points based on time slots during which the link scheduling component 206 determines that the relay node 302 is not communicating with mobile devices or other access points. In an alternative example, the link scheduling component 206 can modify mobile device 306 communication resources based on addition of a supported access point.

Figure 4:
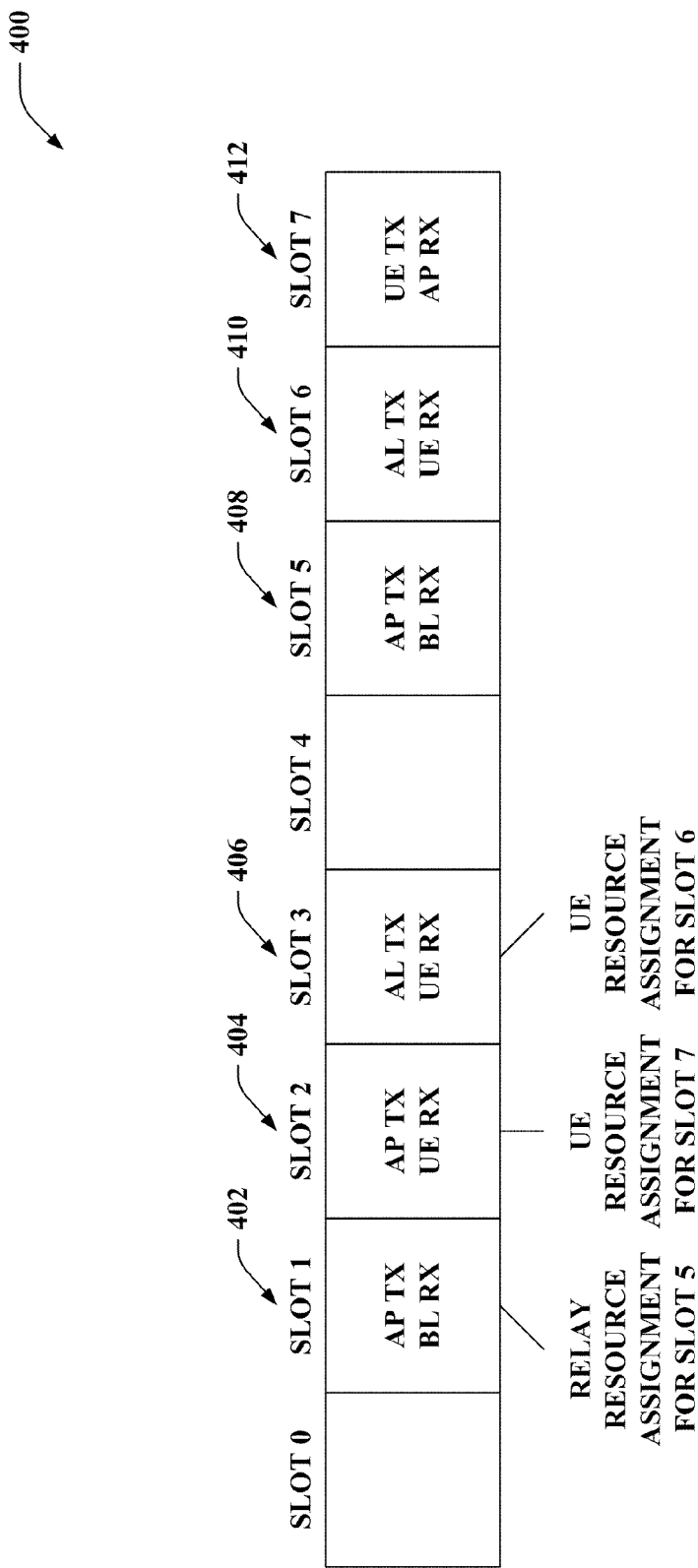
FIG. 4 is an illustration of an example communications frame between a relay node, access point, and mobile device in accordance with aspects described herein.

Referring to FIG. 4, an example communication frame 400 comprising a number of time slots is illustrated. The communication frame can comprise a number of slots or sub-frames (or portions of sub-frames) over which relay nodes, access points, and/or UEs can communicate. In addition, the slots can comprise a collection of OFDM symbols, for example (not shown) over a period of time. In an example, as described, in slot 1 402, an access point (AP) can transmit information over a backhaul link (BL) to a relay node. This information can correspond to a downlink resource assignment for the AP to transmit information to the relay node in slot 5 408 for transmission to the UE. Based on this assignment, the relay node can determine that slot 5 408 should not be used for communicating with the UE since it is allocated for transmitting to the AP over the BL. In slot 2 404, the AP can transmit information received by a UE, which can be an uplink resource assignment for the UE to transmit information to the AP in slot 7 412. Similarly, the relay node can receive and decode this assignment and avoid slot 7 412 in scheduling UE communication, since the UE will be busy transmitting to the AP during that slot.

In slot 3 406, the access link (AL) of the relay node, as described, can transmit a downlink assignment to the UE, since it knows slots other than 5 and 7 are not being used by the BL. Moreover, based on this information, the assignment can be for slot 6 410. In slot 5 408, as described, the access point can transmit information received over the BL, according to the assignment in slot 1 402. The AL can decode and re-transmit the information to the UE in slot 6 410, according to the assignment in slot 3 406, and in slot 7 412, the UE can transmit information to the AP according to the assignment in slot 2 404. Thus, the relay node opportunistically schedules communications with the UE based on BL activity with the access point and/or access point activity with the UE, as described.

Figure 5:
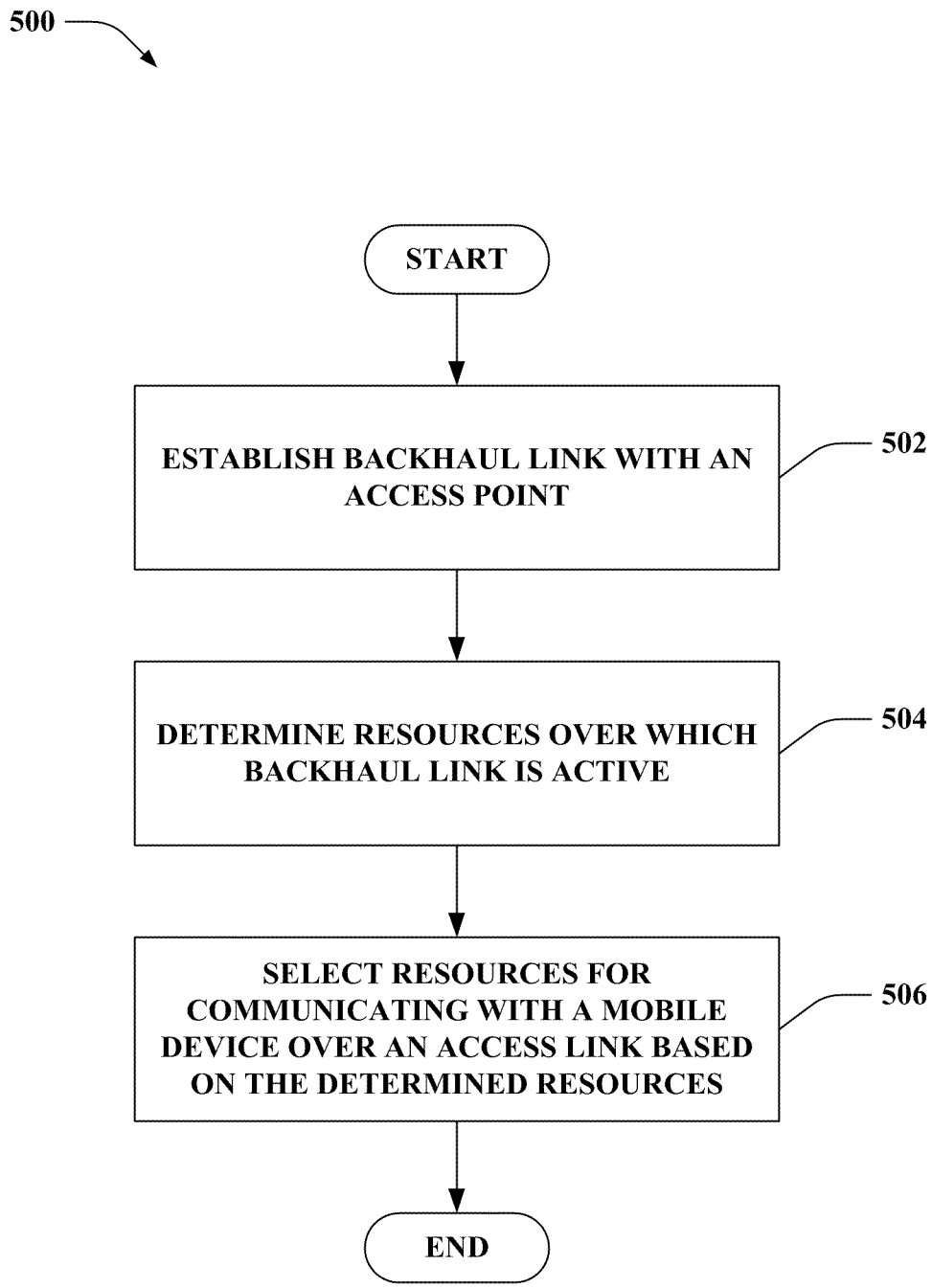
FIG. 5 is an illustration of an example methodology that schedules resources for access link communication based on backhaul link activity.
Figure 6:
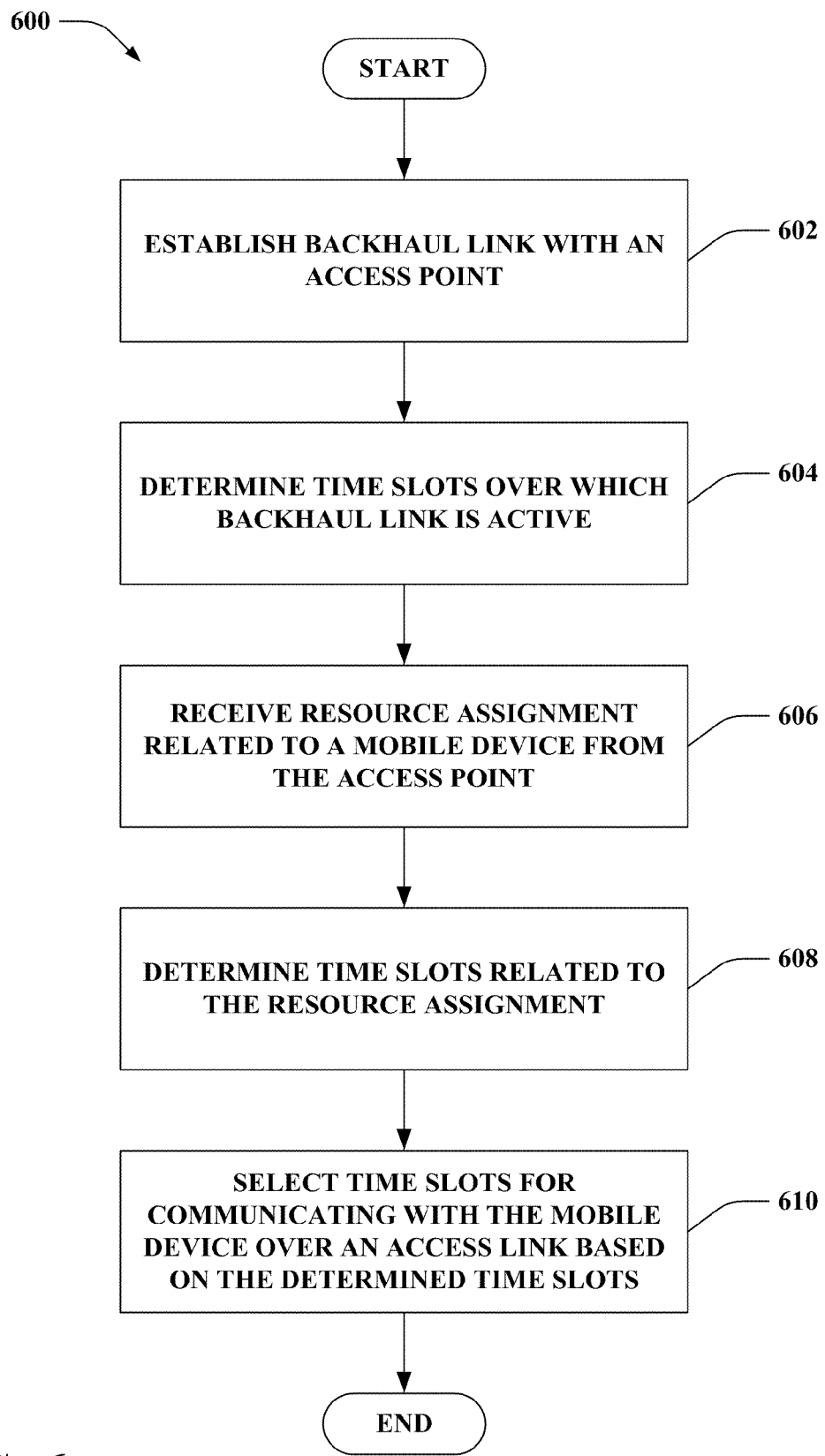
FIG. 6 is an illustration of an example methodology that schedules time slots for access link communication based on mobile device and access point communications.
Figure 7:
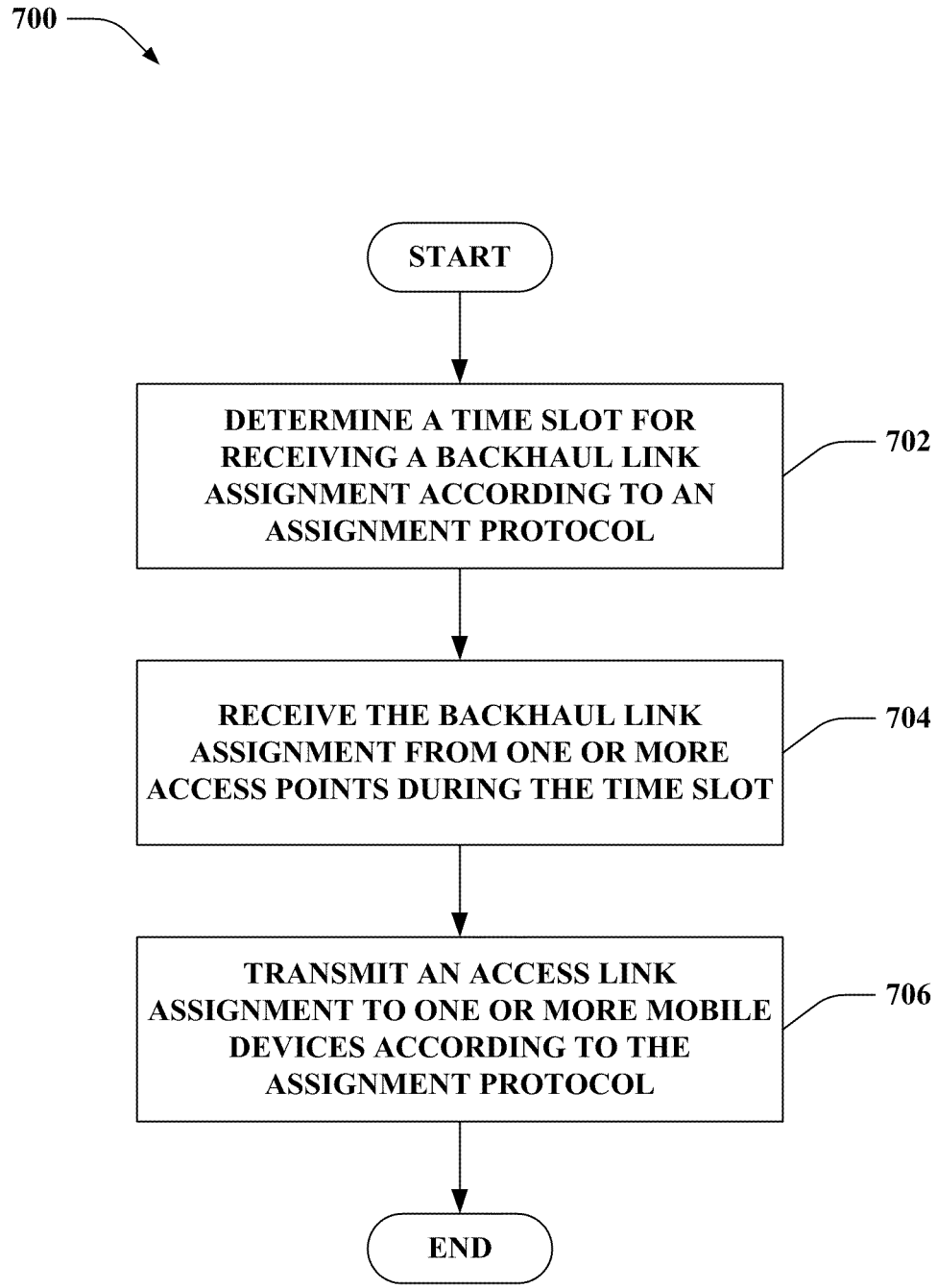
FIG. 7 is an illustration of an example methodology that establishes backhaul and access link communications according to an assignment protocol.

Referring to FIGS. 5-7, methodologies relating to selecting time slots for re-transmitting information to mobile devices in an open half duplex relay node are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 5, an example methodology 500 that facilitates forwarding information to mobile devices over selected resources is illustrated. At 502, a backhaul link can be established with an access point. As described, the backhaul link can comprise a downlink and uplink assignment from the access point for communicating thereover. At 504, resources over which the backhaul link is active can be determined. This can be discerned based at least in part on analyzing an uplink and/or downlink assignment from the access point, observing behaviors of the backhaul link, and/or the like, as described. At 506, resources can be selected for communicating with a mobile device over an access link based on the determined resources. Thus, as described, different resources can be selected so the access link can be opportunistically utilized when the backhaul link is not utilized, for example. Additionally, as described, the resources can relate to time slots, frequency tones, and/or the like.

Referring to FIG. 6, an example methodology 600 is shown that facilitates communicating over an access link using time slots selected so as not to interfere with a backhaul link or access point to mobile device communications. At 602, a backhaul link can be established with an access point. As described, the backhaul link can comprise a downlink and uplink assignment from the access point for communicating thereover. At 604, time slots over which the backhaul link is active can be determined. This can be determined based at least in part on analyzing a resource assignment from the access point, observing behaviors of the backhaul link, and/or the like, as described.

In addition, at 606, a resource assignment related to a mobile device can be received from the access point. The resource assignment, for example, can relate to uplink and/or downlink resources granted to the mobile device by the access point, which indicates when the mobile device is busy transmitting to or receiving from the access point. At 608, time slots related to the resource assignment can be determined. Time slots can be selected for communicating with the mobile device over an access link based on the determined time slots at 610. Thus, time slots associated with the backhaul link can be avoided in scheduling communications with the mobile device as well as time slots during which the mobile device is communicating directly with the access point, as described.

Referring to FIG. 7, an example methodology 700 is shown that facilitates establishing backhaul and access links according to an assignment protocol. At 702, a time slot for receiving a backhaul link assignment can be determined according to an assignment protocol. In one example, the assignment protocol can define an access link latency between an access link resource assignment and an access link communication over the access link resource assignment. The backhaul link assignment time slot can be determined from this information since it occurs before the access link resource assignment. Furthermore, the assignment protocol can define a backhaul link latency between the backhaul link assignment and backhaul link communication over the assignment. The latencies can be fixed or variable, for example. At 704, the backhaul link assignment can be received from one or more access points during the time slot. An access link assignment can be transmitted to one or more mobile devices according to the assignment protocol at 706. As described, this can be pursuant to the access link latency defined by the protocol.

It will be appreciated that, in accordance with one or more aspects described herein, inferences can be made regarding analyzing backhaul link behavior, evaluating resource assignments, determining time slots not utilized by a backhaul link or access point to mobile device communications, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
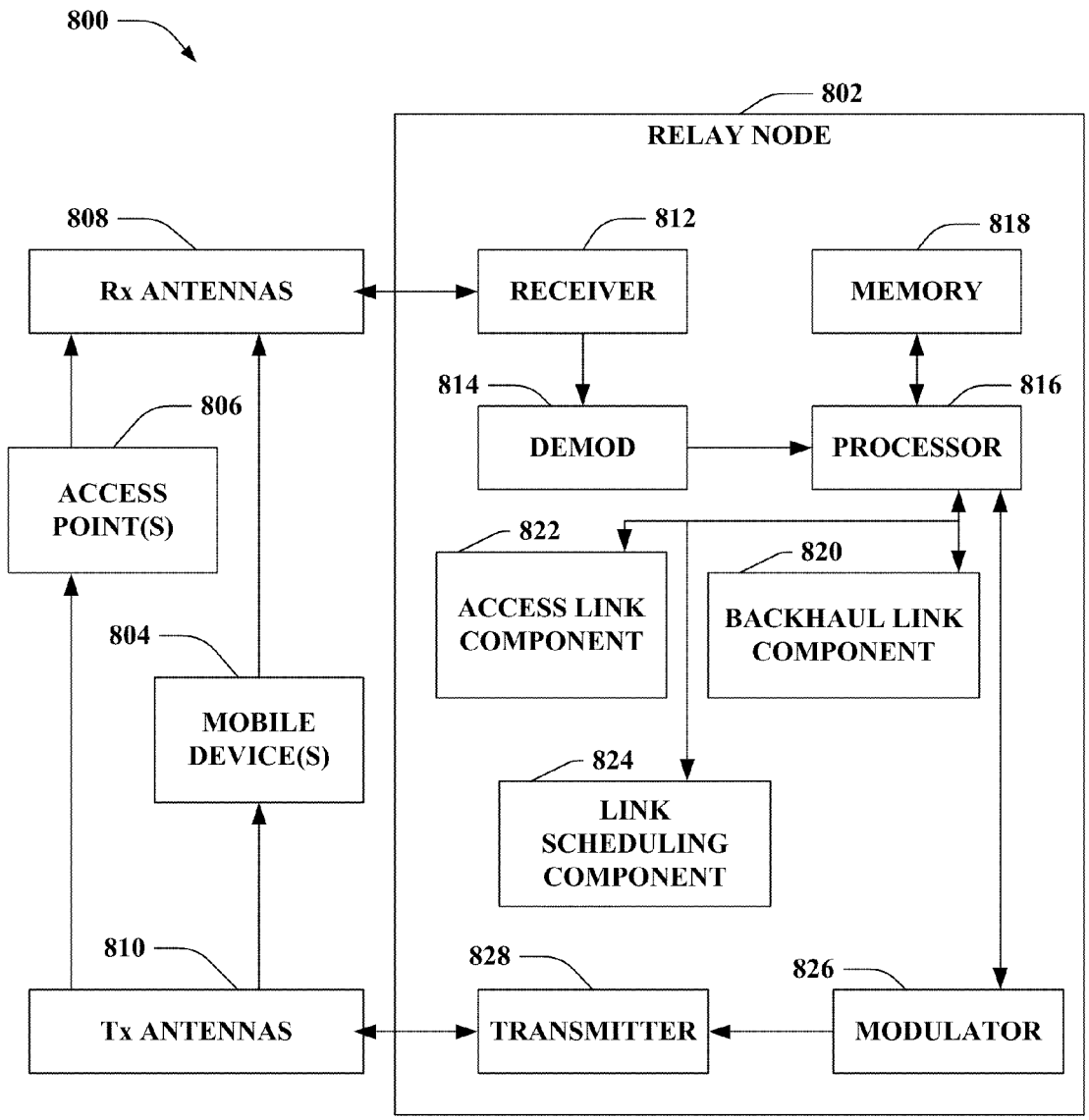
FIG. 8 is an illustration of an example system that provides opportunistic relay node communication.

FIG. 8 is an illustration of a system 800 that facilitates scheduling access link communication time slots based on activity over a backhaul link. The system 800 comprises a relay node 802 (e.g., access point, ...) with a receiver 812 that receives signal(s) from one or more mobile devices 804 or access points 806 through a plurality of receive antennas 808, and a transmitter 828 that transmits to the one or more mobile devices 804 or access points 806 through a transmit antenna 810. Furthermore, demodulator 814 can demodulate received signals. Demodulated symbols are analyzed by a processor 816. Processor 816 can be a processor dedicated to analyzing information received by receiver 812 and/or generating information for transmission by a transmitter 828, a processor that controls one or more components of relay node 802, and/or a processor that collectively analyzes information received by receiver 812, generates information for transmission by transmitter 828, and controls one or more components of relay node 802.

Relay node can additionally comprise memory 818 that is operatively coupled to processor 816 and that can store data to be transmitted, received data, information related to available channels, data associated with analyzed signal and/or interference strength, information related to an assigned channel, power, rate, or the like, and any other suitable information for estimating a channel and communicating via the channel. Memory 818 can additionally store protocols and/or algorithms associated with estimating and/or utilizing a channel (e.g., performance based, capacity based, etc.).

It will be appreciated that the data store (e.g., memory 818) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 818 of the subject systems and methods is intended to comprise, without being limited to, these and any other suitable types of memory.

Processor 816 is further coupled to a backhaul link component 820 that can establish and maintain a backhaul link with one or more access points 806, an access link component 822 that communicate over an access link with one or more mobile devices 804, and a link scheduling component 824 that can allocate communication resources to the access link that do not interfere with time slots utilized over the backhaul link 820 and/or direct communications between the access points 806 and mobile devices 804, as described. For example, the link scheduling component 824 can determine time slots utilized by the backhaul link component 820 based on assignments received by the access points 806, observing the backhaul link component 820 communication, etc.

In addition, for example, the link scheduling component 824 can determine time slots used by one or more mobile devices 804 in communicating with access points 806 based on receiving a resource assignment for the one or more mobile devices 804. The link scheduling component 824 can avoid these time slots in assigning resources to the mobile devices 804 for communication over the access link component 822, as described. Furthermore, although depicted as being separate from the processor 816, it is to be appreciated that the demodulator 814, backhaul link component 820, access link component 822, link scheduling component 824, and/or modulator 826 can be part of the processor 816 or multiple processors (not shown).

Figure 9:
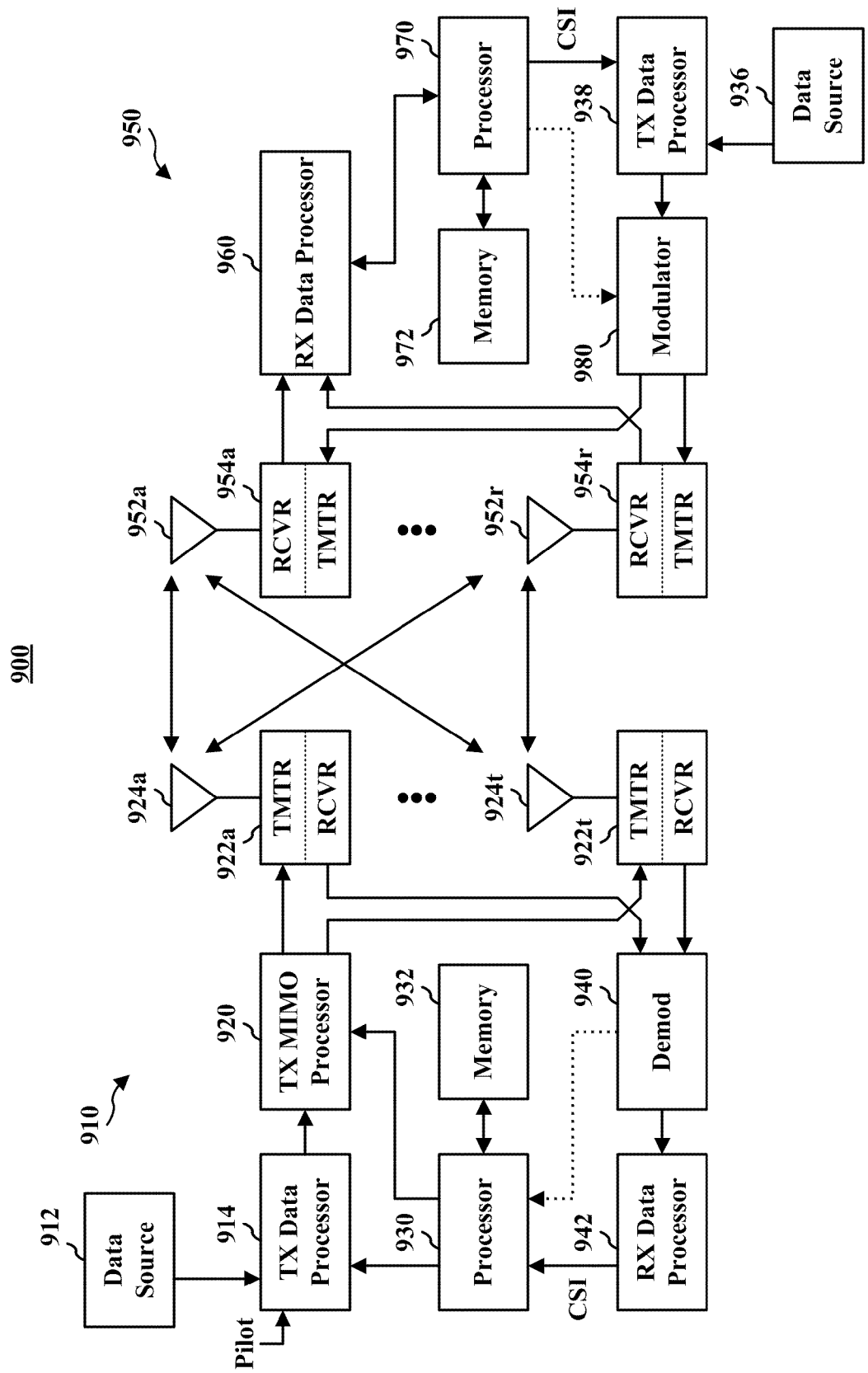
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 8), example communication frames (FIG. 4), and/or methods (FIGS. 5-7) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate an uplink message comprising a matrix index portion and a rank value portion.

The uplink message can comprise various types of information regarding the communication link and/or the received data stream. The uplink message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the uplink message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the aspects described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
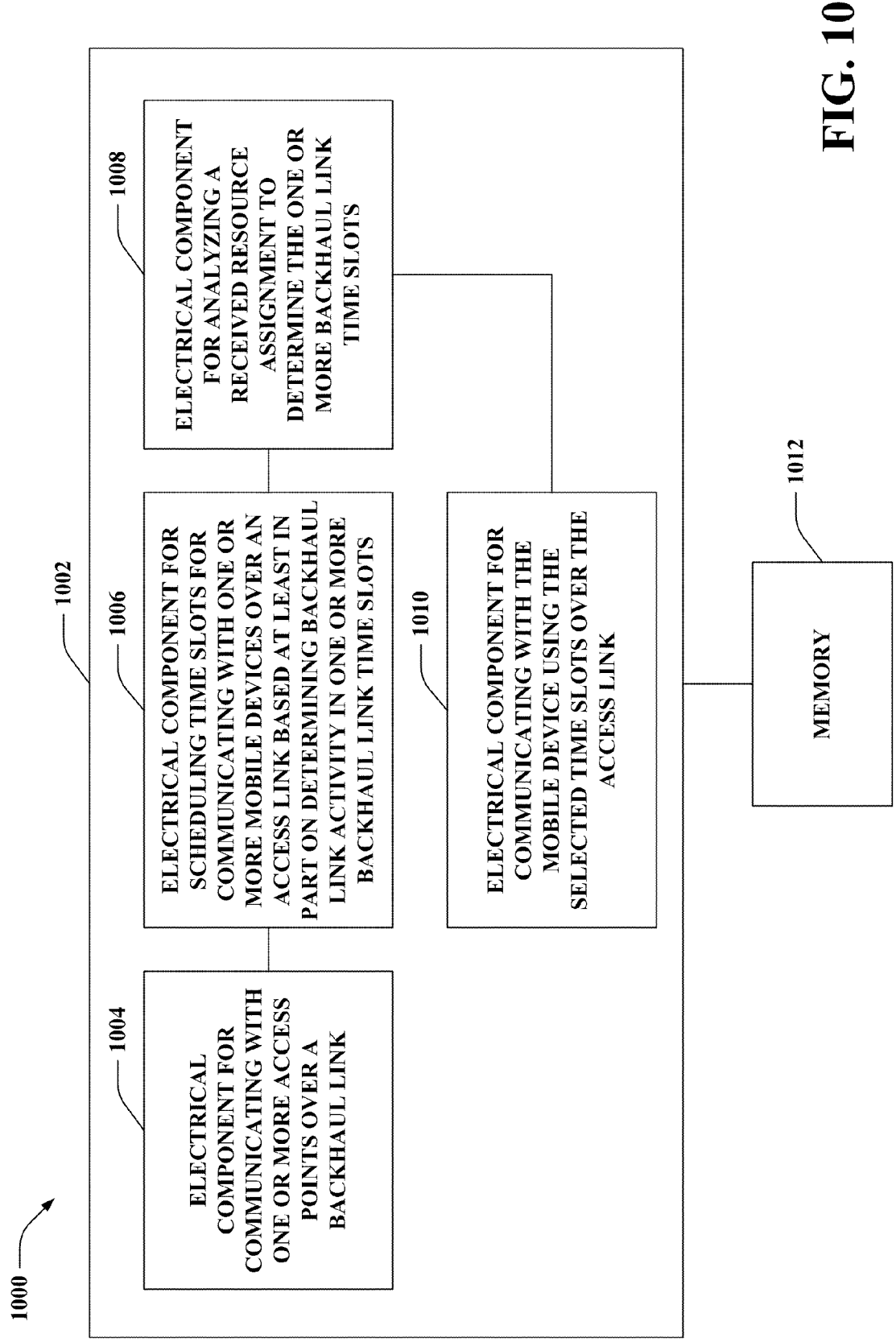
FIG. 10 is an illustration of an example system that opportunistically schedules access link communication in view of backhaul link or other assignments.

With reference to FIG. 10, illustrated is a system 1000 that facilitates scheduling time slots for access link communication that do not collide with time slots for backhaul link or direct mobile device to access point communications. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for communicating with one or more access points over a backhaul link 1004. This can include, for example, receiving and decoding communications for subsequent forwarding to one or more mobile devices. In addition, logical grouping 1002 can include an electrical component for scheduling time slots for communicating with one or more mobile devices over an access link based at least in part on determining backhaul link activity in one or more backhaul link time slots 1006.

Thus, as described, backhaul link activity can be determined based on analyzing a resource assignment received to establish the backhaul link, monitoring backhaul link activity, etc., as described. Moreover, the time slots can be scheduled so as to avoid the backhaul link time slots, as described. In addition, logical grouping 1002 can include an electrical component for analyzing a received resource assignment to determine the one or more backhaul link time slots 1008. The electrical component 1008 can also analyze received resource assignments related to mobile devices to determine time slots related to communication at mobile device. Thus, as described, these time slots can be avoided as well. Furthermore, logical grouping 1002 can include an electrical component for communicating with the mobile device using the selected time slots over the access link 1010. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
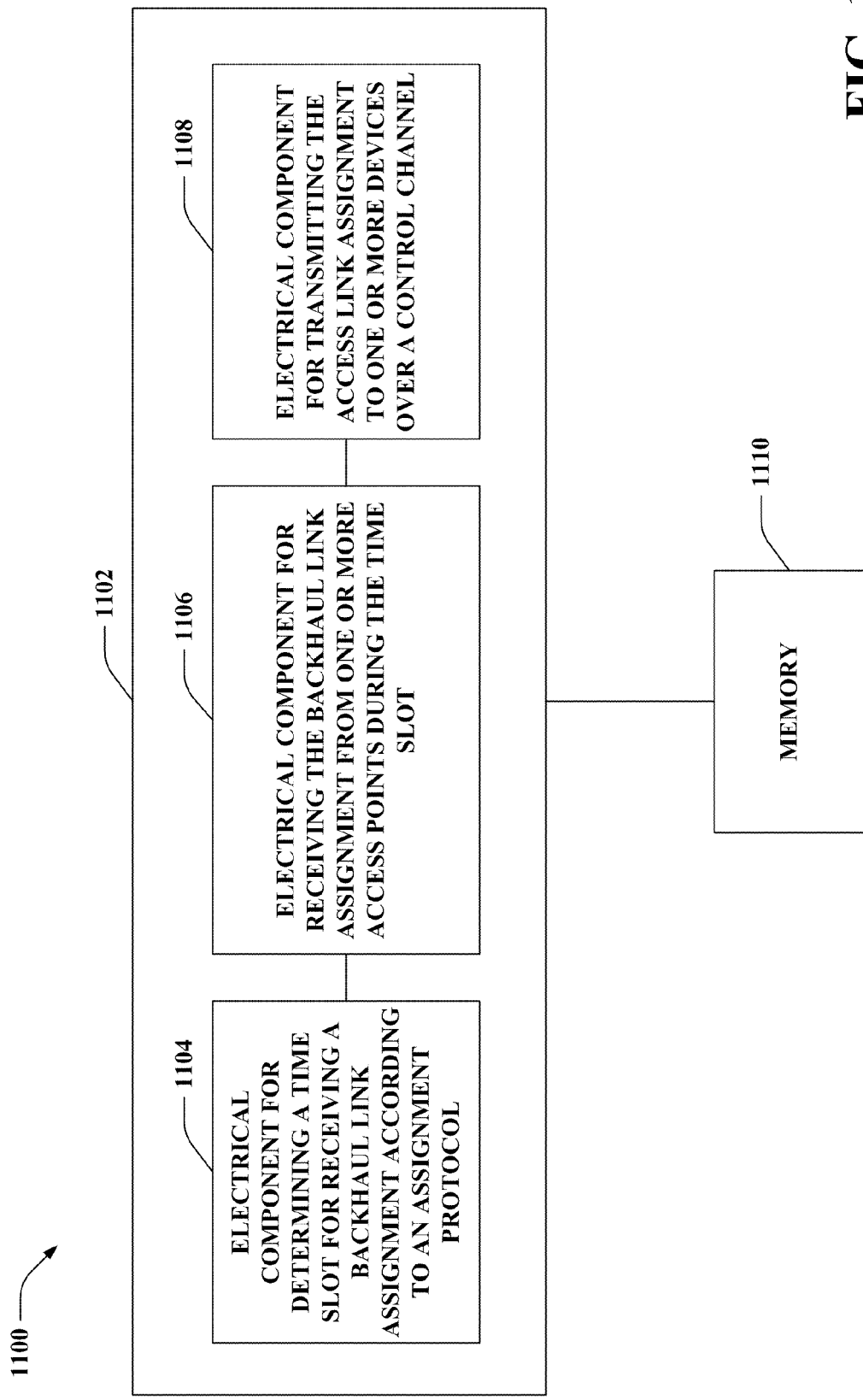
FIG. 11 is an illustration of an example system that establishes backhaul and access link communications according to an assignment protocol.

With reference to FIG. 11, illustrated is a system 1100 that facilitates establishing backhaul and access links according to an assignment protocol. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining a time slot for receiving a backhaul link assignment according to an assignment protocol 1104. As described, the assignment protocol can define an access link latency between an access link resource assignment and an access link communication over the access link resource assignment. The backhaul link assignment time slot can be determined from this information since it occurs before the access link resource assignment. Furthermore, the assignment protocol can define a backhaul link latency between the backhaul link assignment and backhaul link communication over the assignment. The latencies can be fixed or variable, in one example.

In addition, logical grouping 1102 can include an electrical component for receiving the backhaul link assignment from one or more access points during the time slot 1106. In response, for example, an access link assignment can be generated. To this end, logical grouping 1102 can include an electrical component for transmitting the access link assignment to one or more devices over a control channel 1108. This can be according to the assignment protocol as well. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   maintaining, by a relay node, a backhaul link with a base station, the relay node being a relay between the base station and a mobile device, and the base station providing network access to the mobile device;
   determining, by the relay node, at least one backhaul link resource over which information is received from the base station over the backhaul link;
   determining, by the relay node, at least one uplink resource over which information is transmitted from the mobile device to the base station;
   selecting, by the relay node, at least one access link resource for communicating with the mobile device over an access link, the at least one access link resource being different from the at least one backhaul link resource and the at least one uplink resource; and
   transmitting a resource assignment message to the mobile device based at least in part on the selected at least one access link resource.

2. The method of claim 1, further comprising communicating with the mobile device over the access link using the selected at least one access link resource.

3. A wireless relay node, comprising:
at least one processor configured to:
  maintain a backhaul link with a base station, the wireless relay node being a relay between the base station and a mobile device, and the base station providing network access to the mobile device;
  determine at least one backhaul link resource over which the backhaul link is active;
  determine at least one uplink resource over which information is transmitted from the mobile device to the base station;
  select at least one access link resource for communicating with the mobile device over an access link, the at least one access link resource being different from the at least one backhaul link resource and the at least one uplink resource; and
  transmit a resource assignment message to the mobile device based at least in part on the selected at least one access link resource; and a memory coupled to the at least one processor.

4. The wireless communications apparatus of claim 3, wherein the at least one processor is further configured to determine at least one backhaul link resource by analyzing a resource assignment received from the base station.

5. The wireless communications apparatus of claim 3, wherein the at least one processor is further configured to communicate with the mobile device over the access link.

6. A wireless relay node, comprising:
  means for communicating with a base station over a backhaul link, the wireless relay node being a relay between the base station and a mobile device, and the base station providing network access to the mobile device;
  means for determining at least one backhaul link resource over which the backhaul link is active;
  means for determining at least one uplink resource over which information is transmitted directly from the mobile device to the base station;
  means for selecting at least one access link resource for communicating with the mobile device over an access link, the at least one access link resource being different from the at least one backhaul link resource and the at least one uplink resource; and
  means for transmitting a resource assignment message to the mobile device based at least in part on the selected at least one access link resource.

7. The apparatus of claim 6, wherein the means for determining the at least one backhaul link resource comprises means for analyzing a received resource assignment to determine the at least one backhaul link resource.

8. The apparatus of claim 6, further comprising means for communicating with the mobile device over the access link using the at least one access link resource.

9. A computer program product, comprising:
a non-transitory computer-readable medium comprising:
  code for causing a relay node to maintain a backhaul link with a base station, the relay node being a relay between the base station and a mobile device, and the base station providing network access to the mobile device;
  code for causing the relay node to determine at least one backhaul link resource over which the backhaul link is active;
  code for causing the relay node to determine at least one uplink resource over which information is transmitted from the mobile device to the base station;
  code for causing the relay node to select at least one access link resource for communicating with the mobile device over an access link, the at least one access link resource being different from the at least one backhaul link resource and the at least one uplink resource; and
  code for transmitting a resource assignment message to the mobile device based at least in part on the selected at least one access link resource.

10. The computer program product of claim 9, wherein the non-transitory computer-readable medium further comprises code for causing the relay node to communicate with the mobile device over the access link using the at least one access link resource.

11. A relay node, comprising:
  a backhaul link component configured to maintain a backhaul link with a base station, the relay node being a relay between the base station and a mobile device, and the base station providing network access to the mobile device;
  an assignment evaluation component configured:
    to determine at least one backhaul link resource over which the backhaul link is active; and
    to determine at least one uplink resource over which information is transmitted from the mobile device to the base station; and a link scheduling component configured:
    to select at least one access link resource for communicating with the mobile device over an access link, the at least one access link resource being different from the at least one backhaul link resource and the at least one uplink resource; and
    to transmit a resource assignment message to the mobile device based at least in part on the selected at least one access link resource.

12. The apparatus of claim 11, wherein the assignment evaluation component is further configured to analyze a received resource assignment to determine the at least one backhaul link resource.

13. The apparatus of claim 11, further comprising an access link component configured to communicate with the mobile device over the access link using the at least one access link resource.

14. A method, comprising:
  determining, at a relay node, a time slot for receiving a backhaul link assignment according to an assignment protocol,
  wherein the assignment protocol defines an access link latency between a time when the relay node assigns an access link resource to a user equipment and a time when the relay node communicates with the user equipment on an access link over the access link resource assignment; and
  receiving, at the relay node, the backhaul link assignment from an access point during the time slot.

15. The method of claim 14, wherein the access link latency is a fixed latency, the assignment protocol additionally defines a backhaul link latency as fixed between the backhaul link assignment and a backhaul link communication, and the access link latency is less than the backhaul link latency.

16. The method of claim 15, wherein the access link resource assignment is a physical channel that assigns the access link communication over an access link time slot and the backhaul link assignment is a disparate physical channel that assigns the backhaul link communication over a backhaul link time slot.

17. The method of claim 16, further comprising transmitting the access link resource assignment to the user equipment over a control channel.

18. The method of claim 14, wherein the assignment protocol additionally defines a variable backhaul link latency between the backhaul link assignment and a backhaul link communication, and the backhaul link assignment includes information regarding at least one time slot and a periodicity of the at least one time slot for a duration of time.

19. The method of claim 18, wherein receiving the backhaul link assignment includes receiving the backhaul link assignment in an upper layer message.

20. The method of claim 19, wherein the upper layer message is a persistent assignment.

21. A wireless communications apparatus, comprising:
at least one processor configured to:
determine, at a relay node, a time slot for receiving a backhaul link assignment according to an assignment protocol, wherein the assignment protocol defines an access link latency between a time when the relay node assigns an access link resource to a user equipment and a time when the relay node communicates with the user equipment on an access link over the access link resource assignment; and
receive, at the relay node, the backhaul link assignment from an access point during the time slot; and
a memory coupled to the at least one processor.

22. The wireless communications apparatus of claim 21, wherein the access link latency is a fixed latency, the assignment protocol additionally defines a fixed backhaul link latency between the backhaul link assignment and a backhaul link communication, and the access link latency is less than the fixed backhaul link latency.

23. The wireless communications apparatus of claim 22, wherein the access link resource assignment is a physical channel that assigns the access link communication over an access link time slot and the backhaul link assignment is a disparate physical channel that assigns the backhaul link communication over a backhaul link time slot.

24. The wireless communications apparatus of claim 23, wherein the at least one processor is further configured to transmit the access link resource assignment to the user equipment over a control channel.

25. The wireless communications apparatus of claim 21, wherein the assignment protocol additionally defines a variable backhaul link latency between the backhaul link assignment and a backhaul link communication, and the backhaul link assignment includes information regarding at least one time slot and a periodicity of the at least one time slot for a duration of time.

26. The wireless communications apparatus of claim 25, wherein receiving the backhaul link assignment includes receiving the backhaul link assignment in an upper layer message.

27. The wireless communications apparatus of claim 26, wherein the upper layer message is a persistent assignment.

28. An apparatus, comprising:
means for determining, at a relay node, a time slot for receiving a backhaul link assignment according to an assignment protocol, wherein the assignment protocol defines an access link latency between a time when the relay node assigns an access link resource to a user equipment and a time when the relay node communicates with the user equipment on an access link over the access link resource assignment; and
means for receiving, at the relay node, the backhaul link assignment from an access point during the time slot.

29. The apparatus of claim 28, wherein the access link latency is a fixed latency, the assignment protocol additionally defines a fixed backhaul link latency between the backhaul link assignment and a backhaul link communication, and the access link latency is less than the fixed backhaul link latency.

30. The apparatus of claim 29, wherein the access link resource assignment is a physical channel that assigns the access link communication over an access link time slot and the backhaul link assignment is a disparate physical channel that assigns the backhaul link communication over a backhaul link time slot.

31. The apparatus of claim 30, further comprising means for transmitting the access link resource assignment to the user equipment over a control channel.

32. The apparatus of claim 28, wherein the assignment protocol additionally defines a variable backhaul link latency between the backhaul link assignment and a backhaul link communication, and the backhaul link assignment includes information regarding at least one time slot and a periodicity of the at least one time slot for a duration of time.

33. The apparatus of claim 32, wherein receiving the backhaul link assignment includes receiving the backhaul link assignment in an upper layer message.

34. The apparatus of claim 33, wherein the upper layer message is a persistent assignment.

35. A computer program product, comprising:
a non-transitory computer-readable medium comprising program code:
to determine, at a relay node, a time slot for receiving a backhaul link assignment according to an assignment protocol, wherein the assignment protocol defines an access link latency between a time when the relay node assigns an access link resource to a user equipment and a time when the relay node communicates with the user equipment on an access link over the access link resource assignment; and
to receive, at the relay node, the backhaul link assignment from an access point during the time slot.

36. The computer program product of claim 35, wherein the access link latency is a fixed latency, the assignment protocol additionally defines a backhaul link latency as fixed between the backhaul link assignment and a backhaul link communication, and the access link latency is less than the backhaul link latency.

37. The computer program product of claim 36, wherein the access link resource assignment is a physical channel that assigns the access link communication over an access link time slot and the backhaul link assignment is a disparate physical channel that assigns the backhaul link communication over a backhaul link time slot.

38. The computer program product of claim 37, further comprising program code to cause the at least one computer to transmit the access link resource assignment to the user equipment over a control channel.

39. The computer program product of claim 35, wherein the assignment protocol additionally defines a variable backhaul link latency between the backhaul link assignment and a backhaul link communication, and the backhaul link assignment includes information regarding at least one time slot and a periodicity of the at least one time slot for a duration of time.

40. The computer program product of claim 39, wherein receiving the backhaul link assignment includes receiving the backhaul link assignment in an upper layer message.

41. The computer program product of claim 40, wherein the upper layer message is a persistent assignment.

42. A relay node, comprising:
a backhaul link component configured to determine a time slot for receiving a backhaul link assignment according to an assignment protocol and receives the backhaul link assignment during the time slot from an access point, wherein the assignment protocol defines an access link latency between a time when the relay node assigns an access link resource to a user equipment and a time when the relay node communicates with the user equipment on an access link over the access link resource assignment; and an access link component configured to transmit the access link resource assignment to one or more mobile devices according to the access link latency and the backhaul link assignment.

43. The apparatus of claim 42, wherein the access link latency is a fixed latency, the assignment protocol additionally defines a fixed backhaul link latency between the backhaul link assignment and a backhaul link communication, and the access link latency is less than the fixed backhaul link latency.

44. The apparatus of claim 42, wherein the access link resource assignment is a physical channel that assigns the access link communication over an access link time slot and the backhaul link assignment is a disparate physical channel that assigns the backhaul link communication over a backhaul link time slot.

45. The apparatus of claim 42, wherein the assignment protocol additionally defines a variable backhaul link latency between the backhaul link assignment and a backhaul link communication, and the backhaul link assignment includes information regarding at least one time slot and a periodicity of the at least one time slot for a duration of time.

46. The apparatus of claim 45, wherein receiving the backhaul link assignment includes receiving the backhaul link assignment in an upper layer message. assignment.

47. The apparatus of claim 46, wherein the upper layer message is a persistent assignment.

* * * * *